United States Patent [19]

Inoue et al.

[11] Patent Number: 5,055,523

[45] Date of Patent: Oct. 8, 1991

[54] AROMATIC POLYCARBONATE RESIN COMPOSITION

[75] Inventors: Kazushige Inoue; Akhiro Saito, both of Utsunomiya; Takorou Kitamura, Mohka; Takashi Ohtomo, Utsonomiya; Hidenori Tazaki, Utsonomiya; Tetsuji Kodaira, Utsonomiya; Yumiko Yoshida; Hiromi Ishida, both of Mohka; Takahiro Yokoshima, Oyama; Hideyuki Itoi, Utsonomiya, all of Japan

[73] Assignee: CE Plastics Japan Limited, Tokyo, Japan

[21] Appl. No.: 493,973

[22] Filed: Mar. 15, 1990

[30] Foreign Application Priority Data

| Mar. 20, 1989 | [JP] | Japan | 1-66287 |
| Mar. 31, 1989 | [JP] | Japan | 1-82518 |
| Mar. 31, 1989 | [JP] | Japan | 1-82519 |
| Mar. 31, 1989 | [JP] | Japan | 1-82520 |
| Dec. 25, 1989 | [JP] | Japan | 1-332953 |

[51] Int. Cl.$^5$ ............................ C08F 8/00; C08L 31/00
[52] U.S. Cl. ................................. 525/148; 524/109; 525/67; 525/146; 525/147; 525/439
[58] Field of Search ............... 525/146, 147, 148, 439, 525/67; 524/109

[56] References Cited

U.S. PATENT DOCUMENTS 4,400,491  8/1983  Kafer et al. ..................... 528/204
4,741,864  5/1988  Avakian et al. .................. 525/439

Primary Examiner—Paul R. Michl
Assistant Examiner—U. K. Rajguru
Attorney, Agent, or Firm—Kane, Dalsimer, Sullivan, Kurucz, Levy, Eisele and Richard

[57] ABSTRACT

An aromatic polycarbonate composition contains aromatic polycarbonate in which a ratio of the phenolic end group to the non-phenolic end group is at least 1/19, and a copolymer having epoxy or oxazolinyl group, aromatic vinyl-diene-vinyl cyanide copolymer or aromatic polyester, or glass filler. Compatability between the specific aromatic polycarbonate and the other resin, weld strength, melt stability or adhesion to glass filler are improved.

17 Claims, No Drawings

AROMATIC POLYCARBONATE RESIN COMPOSITION

FIELD OF THE INVENTION

This invention relates to an aromatic polycarbonate resin composition, more specifically a resin composition comprising aromatic polycarbonate and at least one other resin or a glass filler.

BACKGROUND OF THE INVENTION

Aromatic polycarbonate resins have excellent mechanical strength, impact resistance, heat resistance and electric properties and, therefore, are used as engineering plastics in many fields. There are known blends of aromatic polycarbonate with various other resins to utilize the properties of aromatic polycarbonate.

It is known to blend aromatic polycarbonate with polyolefin in order to improve oil resistance of aromatic polycarbonate (for instance, Japanese Patent Publication 13663/1965). However, polycarbonate and polyolefin are poorly compatible with each other by nature, so that it is difficult to attain good physical properties. Accordingly, only a limited amount of polyolefin may be added, resulting in a little improvement.

In order to improve the compatibility, it was proposed to use polyolefin modified with an epoxy group in a blend (Japanese Patent Publication 44897/86). This surely improves the compatibility between polycarbonate and polyolefin to some extent, but the improvement attained cannot be evaluated as being sufficient yet. Impact resistance at low temperatures is insufficient in particular. The amount of the epoxy group must be raised to further improve the above, which however leads to an increase in viscosity and a decrease in processability due to the reaction among the epoxy groups. These are undesirable.

Japanese Patent Publication 13384/68 discloses a composition of polycarbonate blended with an acrylic resin. This intends to utilize pearly gloss caused by insufficient compatibility between the two resins and its application is limited.

It is known to blend aromatic polycarbonate with a polystyrene type resin to improve melt flowability of aromatic polycarbonate (for instance, Japanese Patent Publications 6295/68 and 11551/69). Polycarbonate is, however, incompatible with a polystyrene type resin by nature, so that delamination is caused by a shearing stress during molding and impact strength decreases. That is, good physical properties cannot be attained. There is an instance where an organic low-molecular compound such as phosphoric esters and phthalic esters is added to improve the compatibility (Japanese Patent Publication 11551/69). The compatibility is improved to some extent, which is, however, still insufficient. The amount of the polystyrene type resin added is also limited. As its amount increases, delamination is more actualized and impact resistance decreases more significantly.

There is known a method of reacting aromatic polycarbonate with an oxazoline derivative in the presence of catalyst to prepare a cross-linked resin (Japanese Patent Application Laid-Open 248852/88).

Further, aromatic polycarbonate has drawbacks that its molding process temperature is high; its melt flowability is poor; and its impact strength depends greatly upon thickness. Then, it is known to blend an acrylonitrile-butadiene-styrene copolymer, i.e. ABS resin, with aromatic polycarbonate in order to solve the above drawbacks (Japanese Patent Publication 15225/63 and 11142/76).

The composition of aromatic polycarbonate and an ABS resin has being used in large sized molded products such as auto parts in recent years, which however have a problem that extremely poor strength is found in weld parts where a melt resin joins during molding.

It is also known to mix aromatic polyester with aromatic polycarbonate to make use of both the good moldability and chemical resistance of aromatic polyester and the good impact resistance and high glass transition temperature of aromatic polycarbonate (Japanese Patent Applications Laid-Open 54160/73 and 107354/74). However, a molded product prepared from a composition of aromatic polyester and aromatic polycarbonate has a problem that it has poor melt stability so that a Vicat temperature lowers during molding accompanied with residence of the resins.

An attempt was made on a resin composition containing aromatic polycarbonate to improve its mechanical strength, heat resistance, hardness, dimentional stability and stress-cracking resistance by adding a glass filler such as glass fiber (Japanese Patent Applications Laid-Open 199055/85 and 9456/86). However, adhesion between aromatic polycarbonate and a glass filler is insufficient, so that impact strength is extremely low in a molded product prepared from the composition of both.

SUMMARY OF THE INVENTION

The purpose of the invention is to provide an excellent aromatic polycarbonate resin composition comprising aromatic polycarbonate and the aforesaid other resin in which composition the above-described drawbacks are solved.

Another purpose of the invention is to provide a resin composition in which adhesion between aromatic polycarbonate and a glass filler is raised so that impact resistance of a molded product of the composition is improved.

The present inventors have now found that physical properties of a resin composition comprising aromatic polycarbonate and another resin is significantly improved by regulating a ratio of the phenolic end group to the non-phenolic end group of aromatic polycarbonate in a range different from that of the prior art.

The invention provides an aromatic polycarbonate resin composition comprising aromatic polycarbonate and at least one other resin, characterized in that the aromatic polycarbonate has a ratio of phenolic end groups represented by the following formula (I) to non-phenolic end groups represented by the following formula (II) being at least 1/19:

and

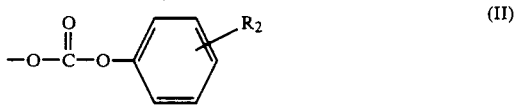

wherein $R_1$ and $R_2$ may be the same or different and independently a hydrogen atom or a $C_1$ to $C_{20}$ alkyl group which may optionally be halogenated; and the other resin is selected from the group consisting of
(a) copolymers derived from at least one ethylenically-unsaturated monomer having an epoxy group or oxazolinyl group and at least one other ethylenically-unsaturated monoer,
(b) aromatic vinyl-diene-vinyl cyanide copolymers and
(c) aromatic polyester.

Another aspect of the invention provides an aromatic polycarbonate resin composition comprising aromatic polycarbonate and a glass filler, characterized in that the aromatic polycarbonate has a ratio of phenolic end groups represented by the following formula (I) to non-phenolic end groups represented by the following formula (II) being at least 1/19;

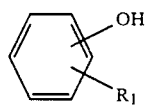
(I)

and

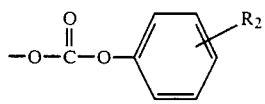
(II)

wherein $R_1$ and $R_2$ may be the same or different and independently a hydrogen atom or a $C_1$ to $C_{20}$ alkyl group which may optionally be hologenated.

DETAILED DESCRIPTION OF THE INVENTION

The regulation of the end groups ratio of aromatic polycarbonate may easily be conducted by preparing aromatic polycarbonate in a transesterification method in which a mole ratio of starting diphenyl carbonate to diphenol, e.g. bisphenol A is controlled. In the present invention, the aromatic polycarbonate may be composed mainly of a repeating unit represented by the formula:

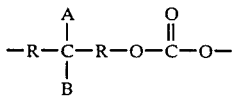

wherein each R represents phenylene, halogen-substituted phenylene or $C_1$ to $C_{20}$ alkyl-substituted phenylene group, and A and B each represent a hydrogen atom, $C_1$ to $C_{12}$ hydrocarbon radical or a moiety forming a cycloalkylene group together with a vicinal carbon atom. When bisphenol A and diphenyl carbonate, for instance, are subjected to transesterification, the ends of aromatic polycarbonate are a phenolic radical derived from bisphenol A or a phenyl radical derived from diphenyl carbonate. Accordingly, as a mole ratio of bisphenol A is set larger in the transesterification, the ratio of the phenolic end group becomes larger in the resulting polycarbonate. Aromatic polycarbonate may be branched. Such branched aromatic polycarbonate may be obtained by reacting a polyfunctional aromatic compound with diphenol and/or carbonate precursor to produce thermoplastic random branched polycarbonate.

In aromatic polycarbonate used previously in general, particularly those prepared in a phosgen method, the ratio of phenolic end groups to non-phenolic end groups is 1/20 or less. That is, in the preparation of polycarbonate where bisphenol A is reacted with phosgene, a small amount of phenol is added to the raw materials or during the reaction so as to cap the polymer terminals through the reaction of the hydroxy group.

According to the invention, the ratio of phenolic end groups to non-phenolic end groups of aromatic polycarbonate is 1/19 or more, preferably 1/10 or more, more preferably 1/5 or more, and up to 1/0. Physical properties of the aromatic polycarbonate composition are improved by adjusting the ratio to the above value.

The content of an OH group of the phenolic end groups may be determined by measuring absorbance at 3600 cm$^{-1}$ in FTIR. The content of the whole end groups may be determined by calculating an average molecular weight from an intrinsic viscosity determined in a solution in methylene chloride. The following Shnell's equation was adopted in converting the intrinsic viscosity (I.V.) into the average molecular weight:

$$I.V. = 1.23 \times 10^{-4} M^{0.83}$$

wherein M is a viscosity-average molecular weight.

In general, compatibility or adhesion of aromatic polycarbonate with other component is enhanced according to the invention. When the resin other than aromatic polycarbonate is a copolymer derived from an ethylenically unsaturated monomer having an epoxy or oxazolinyl group and another ethylenically unsaturated monomer such as olefin, acrylic or styrene monomer, compatibility and, accordingly, impact resistance are improved. Particularly, impact resistance at low temperatures is improved in a composition of aromatic polycarbonate and an olefin or acrylic copolymer having an epoxy or oxazolinyl group, and delamination is prevented in a composition of aromatic polycarbonate and a styrene copolymer having an epoxy or oxazolinyl group. Weld strength is improved in a composition of aromatic polycarbonate and an ABS resin. In a composition of aromatic polycarbonate and an aromatic polyester, melt stability is highly improved. In a composition of aromatic polycarbonate and a glass filler, adhesion between aromatic polycarbonate and a glass filler is enhanced and, accordingly, impact resistance is highly improved.

The resin other than aromatic polycarbonate, contained in the resin composition according to the invention, will be explained below in detail. It may be a copolymer derived from at least one ethylenically unsaturated monomer having an epoxy or oxazolinyl group and at least one other ethylenically unsaturated monomer. Preferred examples of the unsaturated monomers having an epoxy group include glycidyl methacrylate, glycidyl acrylate, vinylglycidyl ether, glycidyl ether of hydroxyalkyl (meth)acrylate, glycidyl ether of polyalkylene glycol (meth)acrylate, and glycidyl itaconate. Preferred examples of the unsaturated monomer having an oxazolinyl group include those represented by the general formula

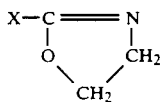

wherein Z is a group having a polymerizable double bond. Preferred examples of group Z include

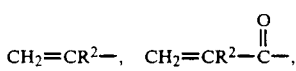

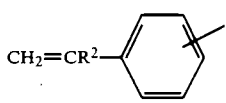

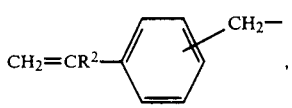

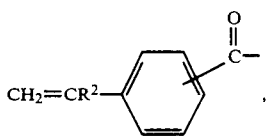

and

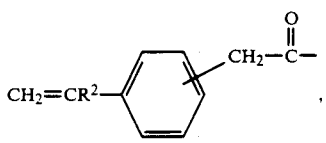

wherein $R^2$ is a hydrogen atom or $C_1$ to $C_6$ alkyl or alkoxy group such as methyl, ethyl, i- or n-propyl and butyl.

Particularly preferred are vinyl oxazoline represented by the general formula

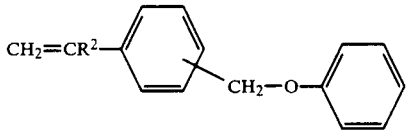

wherein $R^2$ has the aforesaid meaning and is preferably a hydrogen atom or a methyl group.

Examples of olefin monomers copolymerizable with the aforesaid epoxy or oxazolinyl group-containing unsaturated monomers include α-olefines such as ethylene, propylene, 1-butene, 10pentene, 4-methyl-1-pentene, 1-hexene, 1-octene, 1-decene, 1-tetradecene, 1-hexadecene, 1-octadecene and 1-eicosene. Besides these α-olefin components, there may further be added diene components such as butadiene, isoprene, 1,4-hexadiene, 5-ethylidene-2-norbornene and 5-vinyl-2-norbornene, unsaturated carboxylic acids or derivatives thereof such as vinyl acetate, acrylic acid or its salts, methacrylic acid or its salts, acrylic esters, methacrylic esters, maleic acid or anhydride, maleic esters and 2-norbornene-5,6-dicarboxylic acid or anhydride, aromatic vinyl monomers such as styrenes, and vinyl cyanide type monomers such as acrylonitrile. The copolymers may contain both epoxy and oxazolinyl groups.

Examples of the aforesaid acrylic monomers copolymerizable with the unsaturated monomers having an epoxy or oxazolinyl group include acrylic acid, methacrylic acid, and derivatives thereof such as salts and esters. Besides these components, small amounts of α-olefines, dienes, unsaturated carboxylic acids or derivatives thereof, aromatic vinyl monomers and vinyl cyanide type monomers may be contained in the copolymers.

Examples of the aforesaid styrene monomers copolymerizable with the unsaturated monomers having an epoxy or oxazolinyl group include styrene, vinyl toluene and t-butyl styrene. Besides the styrene monomers, other copolymerizable monomers may be copolymerized, such as ethylene, vinyl acetate, methyl methacrylate, methyl acrylate and ethyl acrylate. Alternatively, styrene and butadiene are block polymerized.

In the copolymer derived from the ethylenically unsaturated monomer having an epoxy or oxazolinyl group and the other ethylenically unsaturated monomer, the amount of units originated from the unsaturated monomer having an epoxy or oxazolinyl group accounts preferably for 0.05 to 30% by weight of the copolymer. If the amount is less than 0.05% by weight, compatibility between aromatic polycarbonate and the other resins is poor. If the amount exceeds 30% by weight, no particular increase is attained in the effect of blending aromatic polycarbonate with olefin or acrylic copolymer, i.e. improvement of oil resistance; and in the case of the styrene copolymer, the effect of improving melt flowability lessens, which is presumably due to increased reaction with the terminal OH group of aromatic polycarbonate.

In the composition of the invention, a ratio of the amount of the aromatic polycarbonate to the amount of the copolymer (a) is 50 to 97 wt. %: 50 to 3 wt. %, preferably 60 to 90 wt. %: 40 to 10 wt. %. If the amount of the aromatic polycarbonate is less than 50 wt. %, its intrinsic properties, particularly mechanical properties and heat resistance, are not exhibited. On the other hand, if the amount of the aromatic polycarbonate is larger than 97 wt. % and, accordingly, the amount of the copolymer (a) is less than 3 wt. %, the effects to be attained by blending the copolymer (a) are insufficiently exhibited.

The composition of the invention may further contain polymers having no epoxy or oxazolinyl group, such as olefin or acrylic copolymers, the amount of which is preferably 50 parts by weight or less per 100 parts by weight of the total of the aromatic polycarbonate and resin (a).

Alternatively, the resin other than aromatic polycarbonate may be an aromatic vinyl-diene-vinyl cyanide copolymer (b). The diene is preferably diene rubber polymerized beforehand, such as polybutadiene rubber, acrylonitrile-butadiene copolymer rubber, styrene-butadiene copolymer rubber and polyisoprene rubber. One or more of these may be used. It is preferred to use polybutadiene rubber and/or styrenebutadiene copolymer rubber.

Examples of the vinyl cyanide monomers include acrylonitrile and methacrylonitrile with acrylonitrile being preferred.

Examples of the aromatic vinyl monomers include styrene, α-methyl styrene, p-methyl styrene, p-t-butyl styrene and vinyl toluene. Styrene and/or α-methyl styrene are particularly preferred.

There is no particular limitation on the composition of the copolymer, but it is preferred from viewpoints of moldability and impact resistance of the resulting thermoplastic resin composition that 10 to 70 parts by weight of diene type rubber is contained in 100 pats by weight of the copolymer. 8 to 40 parts by weight of the vinyl cyanide and 20 to 80 parts by weight of the aromatic vinyl monomers are preferred as well.

In the preparation of the copolymer (b), any known methods may be utilized such as bulk polymerization, solution polymerization, bulk-suspension polymerization, suspension polymerization and emulsion polymerization.

In the invention, a weight ratio of the aromatic polycarbonate to the copolymer (b) is 20 to 80 wt. %: 80 to 20 wt. %, preferably 30 to 70 wt. %: 70 to 30 wt. %. If the amount of the aromatic polycarbonate is larger than the above, melt flowability of the composition is worse. On the other hand, if it is less than the above, heat deflection temperature of a molded product is too low.

The resin other than aromatic polycarbonate may also be aromatic polyester (c). The aromatic polyester includes polycondensate polyesters derived from aromatic dicarboxylic acids or derivatives thereof and dihydric alcohols or divalent phenols, polycondensate polyesters obtained from dicarboxylic acids or derivatives thereof and cyclic ethers, polycondensate polyesters obtained from metal salts of dicarboxylic acids and dihalogenated compounds, and polyesters obtained by ring-opening polymerization of cyclic esters, but is not limited to these. By derivatives of acids are herein meant acid anhydrides, acid esters and acid chlorides. Examples of the dicarboxylic acids include terephthalic acid, isophthalic acid, phthalic acid and chlorophthalic acid. Terephthalic acid, isophthalic acid or mixtures thereof is preferred.

Example of the dihydric alcohol include ethylene glycol, propylene glycol, butane-1,4-diol and hexamethylene glycol. Ethylene glycol and butane-1,4-diol are preferred. The divalent phenols include bisphenol A and resorcinol. The cyclic ethers include ethylene oxide and propylene oxide. The cyclic esters include ε-caprolactam. The dihalogenated compound to be reacted with dicarboxylic acid salts refers to compounds in which the two hydroxyl groups of the aforesaid dihydric alcohols or phenols are replaced with halogen atoms such as chlorine or bromine atoms.

Particularly preferred polyesters are poly(1,4-butylene terephthalate) and polyethylene terephthalate.

A weight ratio of the aromatic polycarbonate to the aromatic polyester is 10 to 99 wt. %: 90 to 1 wt. %, preferably 20 to 80 wt. %: 80 to 20 wt. %. If either is less than the above, its desired properties are not exhibited.

Glass fillers used in the invention are not particularly limited in their types or shapes and may be, for instance, glass fibers, milled glass, glass flakes and hollow or solid glass beads. Glass fibers are particularly preferred.

Such glass filler may be subjected to surface treatment with coupling agents such as silane or titanate type ones to enhance adhesion with resins and/or treatment with sizes such as urethane, epoxy or butadiene type ones. Particularly preferred processing agents are epoxy silane type or aminosilane type coupling agents such as γ-aminopropyl trimethoxy silane, γ-aminopropyl triethoxysilane, N-(β-aminoethyl)-γ-aminopropyl trimethoxysilane, γ-glycidoxypropyl trimethoxysilane and γ-glycidoxypropyl methyl dimethoxysilane.

In the composition comprising the aromatic polycarbonate and the glass filler according to the invention, a weight ratio of the aromatic polycarbonate to the glass filler is 100:5 to 200, preferably 100:10 to 120.

To the resin composition according to the invention may further be added other resins and additives such as pigments, dyes, reinforcing agents, fillers, heat resisting agents, antioxidants, anti-weathering agents, lubricants, releasing agents, nucleating agents, plasticizers, flame retardants, flow-improving agents and anti-statics in a mixing process or molding process of the resins, as far as the properties of the composition are not damaged.

The reinforcing fillers may be selected from fine powder alminium, iron or nickel, metal oxides, non-metallic ones such as carbon filaments, silicates such as mica, alminium silicate or clay, talc and asbestos, titanium oxide, wollastnite, novaculite, potassium titanate, titanate whisker, glass flakes, glass beads, glass fibers and polymer fibers or combinations thereof.

The reinforcing fillers may be used in an amount sufficient to yield the reinforcing effect, usually 1 to 60% by weight, preferably 5 to 50% by weight, based on the total weight of the composition. A preferred reinforcing agent is glass such as glass filaments, or a combination of glass with talc, mica or aluminum silicate. Filaments usually used to reinforce plastics are preferrably about 0.00012 to 0.00075 inch, which is however not critical in the invention.

Where the composition according to the invention contains polycarbonate derived from brominated bisphenol, inorganic or organic antimony compounds may further be blended in the composition of the invention to synergistically enhance flame retardance introduced by such polycarbonate. Suitable inorganic antimony compounds are antimony oxide ($Sb_2O_3$), antimony phosphate, $KSb(OH)_6$, $NH_4SbF_6$ and $SbS_3$. A wide variety of organic antimony compounds may also be used such as antimonic esters of organic acids, cyclic alkyl antimonite esters and aryl antimonic acid compounds. Examples of typical organic antimony compounds are potassium antimony tartrate, antimony salt of caproic acid, $Sb(OCH_2CH_3)$, $Sb[OCH(CH_3)CH_2CH_3]_3$, antimony polymethylene glycorate and triphenyl antimony. If used, a preferred antimony compound is antimony oxide.

Hindered phenols, phosphites, metal salts of phosphoric acid, and metal salts of phosphorous acid may be added as a stabilizer or antioxidants.

To prepare the resin composition of the invention, the components may be mixed in any known methods. For instance, the components may be first mixed by a high speed mixer such as a tumbler mixer, Henschel mixer, ribbon blender or supermixer and then melt kneaded in an extruder, Bumbury mixer or rolls.

The invention will further be described with reference to the following Examples, which however do not limit the invention. By "part" is meant part by weight in the Examples.

EXAMPLES 1 AND 2 AND COMPARISON EXAMPLES 1 AND 2

The aromatic polycarbonate used here according to the invention was prepared by transesterification of diphenyl carbonate and bisphenol A and had an intrinsic viscosity of 0.50 dl/g, determined in methylene chloride at 25° C., and a ratio of the phenolic end group to the non-phenolic end group of about 1/1, which was called PC(50).

For comparison, aromatic polycarbonate, Lexan 141 (trade mark, General Electric) having an intrinsic viscosity of 0.50 dl/g, determined in methylene chloride at 25° C., was used, which was prepared by polymerizing bisphenol A in a phosgene method and capping the terminals with a phenyl radical so that a ratio of the phenolic end group was about 1/99, called PC(1).

There were used an ethylene-glycidyl methacrylate copolymer, Bondfast E (trade mark, Sumitomo Chemical Industries) as an olefin copolymer, and polymethyl methacrylate containing 5% by weight of an oxazoline type monomer, CX-RPM-1005, available from Nippon Catalyst Chemical Industries as an acrylic copolymer.

The components were melt kneaded in the weight ratios as indicated in Table 1 by a 65 mm single screw extruder at 280° C. and molded into pellets. Test pieces for Izod impact strength (⅛ inch notched) according to ASTM D 256 were molded from the obtained pellets. High speed impact fructure tests at a temperature of −30° C. were also conducted on molded test pieces having a size of 5 cm×5 cm×3 mm to observe conditions of fracture. The results are summarized in Table 1.

TABLE 1

|  | Ex. 1 | Comp. 1 | Ex. 2 | Comp. 2 |
|---|---|---|---|---|
| PC(50) | 80 |  | 80 |  |
| PC(1) |  | 80 |  | 80 |
| Ethylene-glycidyl methacrylate copolymer | 20 | 20 |  |  |
| Oxazinyl group-containing polymethyl methacrylate |  |  | 20 | 20 |
| Izod impact strength, Kg cm/cm |  |  |  |  |
| at 23° C. | 86 | 84 | 67 | 20 |
| at −30° C. | 67 | 26 | 58 | 16 |
| High speed impact fracture | Ductile | Brittle |  |  |

EXAMPLES 3 TO 6 AND COMPARISON EXAMPLES 3 TO 7

Two kinds of aromatic polycarbonate used in these Examples according to the invention were prepared by transesterification of diphenyl carbonate and bisphenol A and had an intrinsic viscosity of 0.50 dl/g, determined in methylene chloride at 25° C., and ratios of the phenolic end group to the non-phenolic end group of about 3/7 and 1/1, called PC(30) and PC(50), respectively.

For comparison, PC(1) used in Comparison Example 1 was used also here.

There were used polystyrene containing 5% by weight of an oxazoline type monomer, CX-RPS-1005, available from Nippon Catalyst Chemical Industries as an oxazolinyl group-containing polystyrene, and polystyrene containing 5% by weight of glycidyl methacrylate, CP 1005 S, available from Nippon Oils and Fats as an epoxy group-containing polystyrene. For comparison, polystyrene, GPPS CR 3500, available from Dainippon Ink Chemical Industries was used.

The components were melt kneaded in the weight ratios as indicated in Table 2 by a 65 mm single screw extruder at 280° C. and molded into pellets. Melt indexes were determined on the above pellets. The pellets were also molded into test pieces to determine physical properties. The measuring conditions were as follows. The results are summarized in Table 2.

Melt index: 2 mm diameter orifice, load 1.2 kg, and temperature 300° C.

Delamination: a 1/16 inch flame bar was bent to see whether delamination took place or not.

1/8 Inch notched Izod impact strength: ASTM D 256.

TABLE 2

|  | Comparison |  |  |  |  | Example |  |  |  |
|---|---|---|---|---|---|---|---|---|---|
|  | 3 | 4 | 5 | 6 | 7 | 3 | 4 | 5 | 6 |
| PC(1) | 100 |  | 90 | 80 | 60 |  |  |  |  |
| PC(30) |  | 100 |  |  |  |  |  |  | 60 |
| PC(50) |  |  |  |  |  | 90 | 80 | 60 |  |
| Oxazoline group-containing polystyrene |  |  |  |  |  | 10 | 20 | 40 |  |
| Epoxy group-containing polystyrene |  |  |  |  |  |  |  |  | 40 |
| Polystyrene |  |  | 10 | 20 | 40 |  |  |  |  |
| Delamination | — | — | No | No | Observed | No | No | No | No |
| Izod impact strength | 84 | 84 | 12 | 8 | 5 | 29 | 17 | 12 | 13 |
| Melt index | 9 | 8 | 15.6 | 20.4 | 24.9 | 17.5 | 22.3 | 25.0 | 23.1 |

As seen from the Table, the melt index or melt flowability was poor in Comparison Example 3 where no polystyrene was contained. In Comparison Examples 5 to 7 where polystyrene was added, melt flowability was improved, but impact resistance decreased remarkably. In Examples 3 to 6 according to the invention, melt flowability was improved to a similar extent as in the corresponding Comparison Examples 5 to 7, respectively, while decrease in impact strength was significantly prevented. Even when styrene type resins were used in a large amount in Examples 5 and 6, no delamination took place.

EXAMPLE 7 AND COMPARISON EXAMPLE 8

PC(50) used in Example 1 was used also here as the aromatic polycarbonate according to the invention. aromatic polycarbonate for comparison was PC(1) used in Comparison Example 3.

An ABS resin, Toughlex 610 (trade mark, Mitsubishi Monsant), was used as copolymer (b).

The polycarbonate resin and the ABS resin were homogeneously mixed in the weight ratio as indicated in Table 3 in a Henschel mixer, melt kneaded by a 50 mm twin screw extruder set at 260° C. and shaped into pellets by an injection molding machine, Nikko J 40S, set at 260° C. with two gates to obtain impact test pieces of 3×50×50 mm and tensile test pieces (ASTM No. 1 dumbbell). In the central position of both types of the test pieces, there was a weld part where the melt resin joined together. These test pieces were used in the following measurements:

Weld tensile elongation at break: an ASTM No. 1 dumbbell was drawn at a drawing speed of 500 mm/minute at 23° C. until the weld part broke, and elongation was determined.

Weld impact strength: a high speed loading test machine produced by Shimazu Seisakusho was used. On a stand having a circular opening of 25.4 mm in diameter, a test piece of 3×50×50 mm which had be conditioned at −30° C. for 2 hours was set so that the weld line on the test piece lay on the center of the aforesaid opening. A metal bar which had a hemispherical end of 12.7 mm in diameter and was connected to an oil hydraulic piston at the other end was bumped against the test piece downwards at a speed of 5 m/sec to determine energy absorbed until the test piece broke.

The results are summarized in Table 3.

TABLE 3

|  | Example 7 | Comp. Ex. 8 |
| --- | --- | --- |
| PC(50) | 60 |  |
| PC(1) |  | 60 |
| ABS resin | 40 | 40 |
| Weld tensile elongation at break, % | 35 | 10 |
| Weld impact strength at −30° C., kg cm | 330 | 110 |

EXAMPLE 8 AND COMPARISON EXAMPLE 9

Three types of aromatic polycarbonate used in this Example according to the invention were prepared by transesterification of diphenyl carbonate and bisphenol A and had an intrinsic viscosity of 0.51 dl/g, determined in methylene chloride at 25° C. Ratios of the phenolic end group to the non-phenolic end group were 1/9, 3/7 and 9/1, called PC(10), PC(30) and PC(90), respectively. A mole ratio of diphenyl carbonate to bisphenol A was controlled to prepare these.

For comparison, PC(1) used in Comparison Example 1 was used also here.

Polybutylene terephthalate, Valox 315 (trade mark, General Electric), was used as the aromatic polyester, called PBT.

The melt viscosity of the resin composition was determined using a capillary melt viscometer (capillograph) available from Toyo Seiki, Tokyo, which equipment had a heating cylinder and an orifice of the same size as that of a melt index measuring unit set forth in ASTM D 1238. A pre-heated resin sample was passed through the capillary by a mechanically-driven piston at a constant speed selected so as to give a shearing speed of 6 sec$^{-1}$ at the capillary wall. The melt was maintained at 250° C. or 280° C. during the measurement. A force given to the piston was measured by a load cell and recorded continuously on a strip chart. The melt viscosity was calculated from the force given to the piston and the shearing speed at the capillary wall.

Vicat temperatures were determined according to ASTM D 1525 on the following conditions:
Temperature rising speed: 120° C./hour
Size of the test piece: ½×½×2.5 in inch
forty (40) parts of PBT and 60 parts of PC(30) or PC(1) were mixed in a Henschel mixer and then extruded into pellets of the composition by a 65 mm single screw extruder.

The pellets were dried, and resided at 270° C. for a predetermined period of time and then melt viscosity was determined. The results are summarized in Table 4.

TABLE 4

|  | Comp. Ex. 9 | Example 8 |
| --- | --- | --- |
| PBT | 40 | 40 |
| PC(1) | 60 |  |
| PC(30) |  | 60 |
| Melt viscosity, poise |  |  |
| 5 Minutes residence | 4100 | 4000 |
| 10 Minutes residence | 6400 | 3300 |
| 20 Minutes residence | 3000 | 3100 |
| 30 Minutes residence | 2600 | 3000 |

In Comparison Example 9 where PC(1) containing a less amount of the phenolic end group was used, the melt viscosity rose once and then decreased rapidly.

In Example 8, on the other hand, where PC(30) containing a larger amount of the phenolic end group was used, the melt viscosity decreased only gradually and, thus, was stable.

EXAMPLES 9 TO 11 AND COMPARISON EXAMPLE 10

Pellets were prepared from 40 parts of PBT and 60 parts of PC(1), PC(10), PC(30) or PC(90) as mentioned in Example 8.

Test pieces (1) were prepared from each pellets as usually by an extrusion molding machine set at a cylinder temperature of 270° C. Test pieces (2) were extruded after the melt composition resided in a molding machine for 15 minutes.

Vicat temperatures of test pieces (1) and (2) were determined. The results are summarized in Table 5.

TABLE 5

|  | Comp. 10 | Ex. 9 | Ex. 10 | Ex. 11 |
| --- | --- | --- | --- | --- |
| PBT | 40 | 40 | 40 | 40 |
| PC(1) | 60 |  |  |  |
| PC(10) |  | 60 |  |  |
| PC(30) |  |  | 60 |  |
| PC(90) |  |  |  | 60 |
| Vicat temperature |  |  |  |  |
| Test piece (1) | 125 | 118 | 107 | 105 |
| Test piece (2) | 85 | 90 | 91 | 93 |
| Difference | 40 | 28 | 16 | 12 |

In Comparison Example 10, the Vicat temperature of the test pieces (2) decreased remarkably, resulting in a great difference between the test pieces (1) and (2).

In Examples 9 to 11, on the other hand, the difference between the test pieces (1) and (2) was smaller. That is, stable Vicat temperature was attained.

EXAMPLES 12 TO 15 AND COMPARISON EXAMPLES 11 TO 13

The two kinds of aromatic polycarbonate used in the following Examples were prepared by transesterification of diphenyl carbonate and bisphenol A and had an intrinsic viscosity of 0.51 dl/g, determined in methylene chloride at 25° C. Ratios of the phenolic end group to the non-phenolic end group were adjusted to 2/8 and 6/4 by regulating a mole ratio of diphenyl carbonate to bisphenol A, called PC(20) and PC(60), respectively.

For comparison, PC(1) used in Comparison Example 1 was used also here.

As a glass filler, used were glass fiber FES-03-1235 BH (available from Fuji Fiber Glass, hereinafter referred to as GF-a), milled glass MF-A (available from Asahi Fiber Glass, unprocessed, hereinafter GF-b), and glass flakes REF-140 T (available from Nippon Plate Glass, processed with an epoxy silane coupling agent, hereinafter GF-c).

The aromatic polycarbonate and the glass filler were mixed in the amount as indicated in the following Table, extruded by a 65 mm single screw extruder and molded by a 150 ton molding machine into test pieces for Izod impact strength. Izod impact strength was determined according to ASTM D 256-54T A on the following conditions:

Test piece: $\frac{1}{8} \times \frac{1}{2} \times 2.5$ in inch.
Notch: V shape, radius 0.254 mm, and angle ($\theta$) 45°.
Testing machine: Izod tester of Toyo Seiki The results are summarized in Table 6.

Besides, small pieces were cut out from the above molded products and observed by a scanning electron microscope (SEM) at magnification of 3000 to find that adhesion between the aromatic polycarbonate and the glass filler was good.

TABLE 6

|  | Ex. 12 | Ex. 13 | Comp. 11 | Ex. 14 | Ex. 15 | Comp. 12 | Comp. 13 |
|---|---|---|---|---|---|---|---|
| Component, part by weight | | | | | | | |
| Aromatic polycarbonate | | | | | | | |
| PC(1) |  |  | 70 |  |  | 90 | 90 |
| PC(20) | 70 |  |  |  |  |  |  |
| PC(60) |  | 70 |  | 90 | 90 |  |  |
| Glass filler | | | | | | | |
| GF-a | 30 | 30 | 30 |  |  |  |  |
| GF-b |  |  |  | 10 |  | 10 |  |
| GF-c |  |  |  |  | 10 |  | 10 |
| Izod impact strength (kg cm/cm) | 22.0 | 24.0 | 12.0 | 10.6 | 13.4 | 5.8 | 7.2 |

What is claimed is:

1. A composition, which comprises;
   1. an aromatic polycarbonate resin having a ratio of non-phenolic end groups represented by the following formula (II) to phenolic end groups represented by the following formula (I) being not more than 19:1;

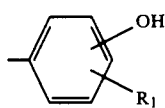 (I)

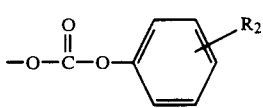 (II)

wherein $R_1$ and $R_2$ may be the same or different and independently represent a hydrogen atom, a $C_1$ to $C_{20}$ alkyl group or a halogen-substituted $C_1$ to $C_{20}$ alkyl group;
   2. a second resin selected from the group consisting of
      (a) copolymers derived from at least one ethylenically-unsaturated monomer having an epoxy group or oxazolinyl group and at least one other ethylenically-unsaturated monomer;
      (b) aromatic vinyl-diene-vinyl cyanide copolymers; and
      (c) an aromatic polyester.

2. The composition as described in claim 1, wherein the ratio is not more than 10:1.

3. The composition as described in claim 1, wherein the ratio is not more than 5:1.

4. The composition as described in claim 1, 2 or 3, wherein resin (a) is an olefin, acrylic or styrene type copolymer having epoxy or oxazolinyl groups, and is contained in an amount of 3 to 50 parts by weight for 50 to 97 parts by weight of the aromatic polycarbonate.

5. The composition as described in claim 4, wherein resin (a) is contained in an amount of 10 to 40 parts by weight for 60 to 90 parts by weight of the aromatic polycarbonate.

6. The composition as described in claim 1, 2 or 3, wherein resin (b) is contained in an amount of 20 to 80 parts by weight for 20 to 80 parts by weight of the aromatic polycarbonate.

7. The composition as described in claim 6, wherein resin (b) is contained in an amount of 30 to 70 parts by weight for 30 to 70 parts by weight of the aromatic polycarbonate.

8. The composition as described in claim 1, 2, or 3, wherein resin (c) is contained in an amount of 1 to 90 parts by weight for 10 to 99 parts by weight of the aromatic polycarbonate.

9. The composition as described in claim 8, wherein resin (c) is contained in an amount of 20 to 80 parts by weight for 20 to 80 parts by weight of the aromatic polycarbonate.

10. The composition as described in claim 1, 2 or 3, wherein the aromatic polycarbonate is prepared in transesterification.

11. The composition as described in any one of claims 1 to 9, wherein the composition further contains a filler and/or flame retardant.

12. An aromatic polycarbonate resin composition, which comprises;
   an aromatic polycarbonate and a glass filler, said polycarbonate having a ratio of non-phenolic end groups represented by the following formula (II) to phenolic end groups represented by the following formula (I) being not more than 19:1;

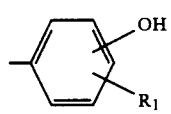 (I)

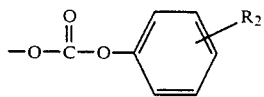

wherein $R_1$ and $R_2$ may be the same or different and independently represent a hydrogen atom, a $C_1$ to $C_{20}$ alkyl group or a halogen-substituted $C_1$ to $C_{20}$ alkyl group.

13. The composition as described in claim 12, wherein the ratio is not more than 10:1.

14. The composition as described in claim 12, wherein the ratio is not more than 5:1.

15. The aromatic polycarbonate resin composition as described in claim 12, 13, or 14, wherein the glass filler is contained in an amount of 5 to 200 parts by weight per 100 parts by weight of the aromatic polycarbonate.

16. The aromatic polycarbonate resin composition as described in claim 15, wherein the glass filler is contained in an amount of 10 to 120 parts by weight per 100 parts by weight of the aromatic polycarbonate.

17. The aromatic polycarbonate resin composition as described in claim 12, 13 or 14, wherein the aromatic polycarbonate is prepared in transesterification.

* * * * *

UNITED STATES PATENT AND TRADEMARK OFFICE
CERTIFICATE OF CORRECTION

PATENT NO. : 5,055,523
DATED : October 8, 1991
INVENTOR(S) : Inoue et al

It is certified that error appears in the above-identified patent and that said Letters Patent is hereby corrected as shown below:

On the title page: Item [73] Assignee is incorrectly listed as CE Plastics Japan, Tokyo, Japan, it should read: GE Plastics Japan Limited, Tokyo, Japan.

Signed and Sealed this

Twenty-eighth Day of April, 1998

Attest:

BRUCE LEHMAN

Attesting Officer

Commissioner of Patents and Trademarks

(12) EX PARTE REEXAMINATION CERTIFICATE (6472nd)
United States Patent
Inoue et al.

(10) Number: US 5,055,523 C1
(45) Certificate Issued: Oct. 14, 2008

(54) AROMATIC POLYCARBONATE RESIN COMPOSITION

(75) Inventors: Kazushige Inoue, Utsunomiya (JP); Akhiro Saito, Utsunomiya (JP); Takorou Kitamura, Mohka (JP); Takashi Ohtomo, Utsonomiya (JP); Hidenori Tazaki, Utsonomiya (JP); Tetsuji Kodaira, Utsonomiya (JP); Yumiko Yoshida, Mohka (JP); Hiromi Ishida, Mohka (JP); Takahiro Yokoshima, Oyama (JP); Hideyuki Itoi, Utsonomiya (JP)

(73) Assignee: General Electric Company, Schenectady, NY (US)

Reexamination Request:
No. 90/007,205, Sep. 16, 2004

Reexamination Certificate for:
Patent No.: 5,055,523
Issued: Oct. 8, 1991
Appl. No.: 07/493,973
Filed: Mar. 15, 1990

Certificate of Correction issued Apr. 28, 1998.

(30) Foreign Application Priority Data

| Mar. 20, 1989 | (JP) | 1-66287 |
|---|---|---|
| Mar. 31, 1989 | (JP) | 1-82518 |
| Mar. 31, 1989 | (JP) | 1-82519 |
| Mar. 31, 1989 | (JP) | 1-82520 |
| Dec. 25, 1989 | (JP) | 1-332953 |

(51) Int. Cl.
*C08L 69/00* (2006.01)

(52) U.S. Cl. .......... 525/148; 524/109; 525/67; 525/146; 525/147; 525/439

(58) Field of Classification Search ............ None
See application file for complete search history.

(56) References Cited

U.S. PATENT DOCUMENTS

| 3,153,008 A | 10/1964 | Fox |
|---|---|---|
| 3,218,372 A | 11/1965 | Okamura et al. |
| 3,442,854 A | 5/1969 | Curtius et al. |
| 3,535,280 A | 10/1970 | Schnell et al. |
| 3,864,428 A | 2/1975 | Nakamura et al. |
| 4,044,073 A | 8/1977 | Baron et al. |
| 4,257,937 A | 3/1981 | Cohen et al. |
| 4,358,563 A | 11/1982 | Quinn et al. |
| 4,390,657 A | 6/1983 | Liu |
| 4,438,255 A | 3/1984 | Rosenquist |
| 4,439,582 A | 3/1984 | Henton |
| 4,496,693 A | 1/1985 | Rosenquist et al. |
| 4,515,921 A | 5/1985 | Witman |
| 4,520,164 A | 5/1985 | Liu |
| 4,530,965 A | 7/1985 | Bourland |
| 4,564,655 A | 1/1986 | Liu |
| 4,579,903 A | 4/1986 | Liu et al. |
| 4,594,387 A | 6/1986 | Muramatsu et al. |
| 4,595,733 A | 6/1986 | Tyrell et al. |
| 4,628,074 A | 12/1986 | Boutni |
| 4,665,125 A | 5/1987 | Kishida et al. |
| 4,666,985 A | 5/1987 | Liu |
| 4,741,864 A | 5/1988 | Avakian et al. |
| 4,746,701 A | 5/1988 | Kress et al. |
| 4,746,711 A | 5/1988 | Serini et al. |
| 4,764,555 A | 8/1988 | Shigemitsu et al. |
| 4,839,410 A | 6/1989 | Atomori et al. |
| 4,880,874 A | 11/1989 | Hirai et al. |
| 4,880,876 A | 11/1989 | Hub et al. |
| 4,886,875 A | 12/1989 | Gay et al. |
| 4,888,388 A | 12/1989 | Hongo et al. |
| 4,895,897 A | 1/1990 | Kaufman |
| 4,906,689 A | 3/1990 | Boutni |
| 4,923,926 A | 5/1990 | Schueler et al. |
| 4,931,503 A | 6/1990 | Routni et al. |
| 5,021,508 A | 6/1991 | Taubitz et al. |
| 5,151,491 A | 9/1992 | Sakashita et al. |
| 6,500,914 B1 * | 12/2002 | Brack et al. ............ 528/196 |

FOREIGN PATENT DOCUMENTS

| EP | 106027 | 4/1984 |
|---|---|---|
| EP | 141268 | 5/1985 |
| EP | 207388 | 1/1987 |
| EP | 281779 | 9/1988 |
| EP | 307963 | 3/1989 |
| EP | 360578 | 3/1990 |
| GB | 1430600 | 3/1976 |
| GB | 1592206 | 7/1981 |
| JP | 36-694 | 2/1961 |
| JP | 64-75549 | 3/1969 |
| JP | 38-15225 | 5/1972 |
| JP | 47-17978 | 5/1972 |
| JP | 48-54160 | 7/1973 |
| JP | 53-12537 | 7/1973 |
| JP | 49-99153 | 9/1974 |
| JP | 49-107354 | 10/1974 |
| JP | 54-30009 | 9/1979 |
| JP | 56-14549 | 2/1981 |
| JP | 56-18639 | 2/1981 |
| JP | 56-18647 | 2/1981 |
| JP | 56-116746 | 9/1981 |
| JP | 57-25350 | 2/1982 |
| JP | 58-17153 | 2/1983 |
| JP | 58-19328 | 2/1983 |
| JP | 58-157848 | 9/1983 |
| JP | 58-196250 | 11/1983 |

(Continued)

OTHER PUBLICATIONS

Schnell, Chemistry and Physics of Polycarbonates, 1964 pp. 44–45.*

Memoranda relating to the level of ordinary skill in the art.

Macromolecules, vol. 19, No. 11, pp. 2810–2825 (1986).

(Continued)

*Primary Examiner*—Dwayne C Jones

(57) ABSTRACT

An aromatic polycarbonate composition contains aromatic polycarbonate in which a ratio of the phenolic end group to the non-phenolic end group is at least 1/19, and a copolymer having epoxy or oxazolinyl group, aromatic vinyl-diene-vinyl cyanide copolymer or aromatic polyester, or glass filler. Compatability between the specific aromatic polycarbonate and the other resin, weld strength, melt stability or adhesion to glass filler are improved.

FOREIGN PATENT DOCUMENTS

| | | |
|---|---|---|
| JP | 59-155436 | 9/1984 |
| JP | 60-212459 | 10/1985 |
| JP | 61-57642 | 3/1986 |
| JP | 61-120852 | 6/1986 |
| JP | 61-120853 | 6/1986 |
| JP | 62-18466 | 1/1987 |
| JP | 62-172019 | 7/1987 |
| JP | 63-132961 | 6/1988 |
| JP | 63-170457 | 7/1988 |
| JP | 63-215714 | 9/1988 |
| JP | 63-215749 | 9/1988 |
| JP | 63-215760 | 9/1988 |
| JP | 63-215764 | 9/1988 |
| JP | 63-248852 | 10/1988 |
| JP | 63-265952 | 11/1988 |
| JP | 63-308034 | 12/1988 |
| JP | 2-180925 | 7/1990 |

OTHER PUBLICATIONS

Polymer Analysis Handbook, pp. 342–344 (1985).
Polymer Analysis Handbook, pp. 337–347 (1987).
Die Makromolekulare Chemie, vol. 88, pp. 215–231 (1965).
Polycarbonates, vol. 27, pp. 519–522 (1978).
Polycarbonate Resin, pp. 4–5, 64–67, 134–135 (1981).
Japan Plastics, pp. 50–53, 88 (1966).
Encyclopedia of Plastics Technology, pp. 2–5, 28–29 (1971).
Teijin's Catalogue of Panlite (1986).
Novarex Technical Document.
Polycarbonates, pp. 48–53 (1962).
Polycarbonate Resin Handbook (1992).
Countermeasures (1981).
Yupiron Technical Material.
Apr. 1, 2001, Decision by Opposition Board of European Patent Office.
Dec. 1999, Decision by Japanese Patent Office (JP Patent No. 2,683,622).
Oct. 1998, Decision by Japanese Patent Office (JP Patent No. 2,139,949).
Mar. 1998, Decision by Japanese Patent Office (JP Patent No. 2,137,200).
European Search Report for EP 389,055 (Oct. 23, 1991).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–17 are cancelled.

New claims 18–23 are added and determined to be patentable.

18. A composition, which comprises:

1. an aromatic polycarbonate resin prepared by a transesterification reaction having a ratio of non-phenolic end groups represented by the following formula (II) to phenolic end groups represented by the following formula (I) being between about 10:1 and about 7:3;

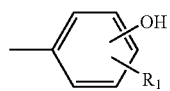 (I)

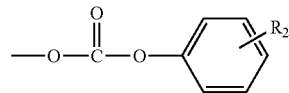 (II)

wherein $R_1$ and $R_2$ may be the same or different and independently represent a hydrogen atom, a $C_1$ to $C_{20}$ alkyl group or a halogen-substituted $C_1$ to $C_{20}$ alkyl group; and 2. a second resin being an aromatic vinyl-diene-vinyl cyanide copolymer.

19. The composition as described in claim 18, wherein the ratio is between about 10:1 and 5:1.

20. The composition as described in claim 18 or 19 wherein the second resin is contained in an amount of 20 to 80 parts by weight for 80 to 20 parts by weight of the aromatic polycarbonate.

21. The composition as described in claim 18 or 19, wherein the second resin is contained in an amount of 30 to 70 parts by weight for 70 to 30 parts by weight of the aromatic polycarbonate.

22. The composition as described in claim 18 or 19, wherein the composition further contains a filler and/or flame retardant.

23. The composition as claimed in claim 18 or 19, wherein said second resin comprises acrylonitrile-butadiene-styrene copolymer.

\* \* \* \* \*